United States Patent [19]

Liu

[11] Patent Number: 5,521,487

[45] Date of Patent: May 28, 1996

[54] ACTIVE FILTER FOR SINGLE-PHASE OVERHEAD CONTACT WIRE ENERGIZED LOCOMOTIVE

[75] Inventor: Rong F. Liu, Villeurbanne, France

[73] Assignee: GEC Alsthom Transport SA, Paris, France

[21] Appl. No.: 109,926

[22] Filed: Aug. 23, 1993

[30] Foreign Application Priority Data

Aug. 25, 1992 [FR] France ..................... 92 10259

[51] Int. Cl.$^6$ ........................................... G05F 1/70
[52] U.S. Cl. .................... 323/207; 363/40; 363/71
[58] Field of Search ..................... 323/207; 363/40, 363/41, 71, 95, 96, 98, 132, 136; 105/49

[56] References Cited

U.S. PATENT DOCUMENTS

| | | | |
|---|---|---|---|
| 3,900,792 | 8/1975 | Moltgen | 323/207 |
| 3,932,799 | 1/1976 | Frank et al. | 323/207 |
| 4,159,513 | 6/1979 | Gemp et al. | 363/71 |
| 4,674,025 | 6/1987 | Edwards | 363/71 |
| 5,040,105 | 8/1991 | Dhyanchand et al. | 363/71 |
| 5,051,684 | 9/1991 | Angquist | 323/207 |
| 5,371,664 | 12/1994 | Seki | 323/207 |

FOREIGN PATENT DOCUMENTS

3725515A1  2/1989  Germany .................. H02M 1/12

OTHER PUBLICATIONS

Japanese Patent Abstract JPA 21 64201—Jun. 25, 1990.
Japanese Patent Abstrat JP 57186978 dated Nov. 17, 1982.
Japanese Patent Abstract JP60236844 dated Nov. 25, 1985.

*Primary Examiner*—Jeffrey L. Sterrett
*Attorney, Agent, or Firm*—Sughrue, Mion, Zinn, Macpeak & Seas

[57] ABSTRACT

An active filter for filtering the current and optionally improving the power factor of a single-phase overhead contact wire energized locomotive includes an arrangement for collecting the voltage supplied by the overhead contact wire and for distributing voltages to the traction equipment and auxiliary equipment of the locomotive. It also includes two or more forced switching mode bridge circuits connected in series on the alternating current side and fed with respective independent direct current voltages. A control system forces switching of the bridge circuits to produce an alternating current on the single-phase side from different voltage levels resulting from combination of the direct current voltages from the bridge circuits. This current is fed to the collecting and distributing arrangement to compensate the harmonic frequencies generated and optionally the reactive power consumed by the traction equipment and the auxiliary equipment and retransmitted to the overhead contact wire.

1 Claim, 4 Drawing Sheets

INPUT
TRANSFORMER

INPUT
TRANSFORMER

ACTIVE FILTER FOR SINGLE-PHASE OVERHEAD CONTACT WIRE ENERGIZED LOCOMOTIVE

BACKGROUND OF THE INVENTION

1. Field of the invention

The present invention concerns an active filter for filtering the current and optionally for improving the power factor of a single-phase overhead contact wire energized locomotive.

2. Description of the Prior Art

Telecommunication lines alongside railroad tracks may suffer interference due to the traction current flowing in the overhead contact wire and returning to the substation via the rail and the ground. This combination forms loops which generate a magnetic field and mainly causes interference on overhead conductors. The interference is worse if the conductors have no protective metal jacket.

In the absence of any protective measures, the interference voltages generated on low current conductors can be hazardous to personnel or to plant and can cause malfunctions. The railroad transmission system and the public network are susceptible to such interference over transverse distances up to two or three kilometers.

Single-phase overhead contact wire energized locomotives are equipped with AC/DC converters. On most French locomotives this converter is of the hybrid bridge circuit type. These rectifier bridge circuits operate in a natural switching mode which implies consumption of reactive power and generation of distortion which is retransmitted to the overhead contact wire.

Much work has been done on adding an input active filter to locomotives in order to reduce such interference, caused mainly by natural switching mode power supply bridge circuits. The principle is to provide a controlled current source in parallel with the overhead contact wire and able to inject into the latter currents of sufficient amplitude. The controllable current source may be based on a current loop voltage inverter connected to an auxiliary winding of the traction transformer, for example. The direct current supply to the inverter must have an amplitude greater than the peak secondary voltage.

As yet this work has not produced any practically usable devices. To overcome this shortcoming the present invention proposes an active filter with multiple voltage levels which is remarkably effective in filtering supply current harmonics.

SUMMARY OF THE INVENTION

The invention consists in an active filter for filtering the current and optionally improving the power factor of a single-phase overhead contact wire energized locomotive comprising means for collecting the voltage supplied by said overhead contact wire and means for distributing voltages to the traction equipment and auxiliary equipment of said locomotive, two or more forced switching mode bridge circuits connected in series on the alternating current side and fed with respective independent direct current voltages, and a control system which forces switching of said bridge circuits to produce an alternating current on the single-phase side from different voltage levels resulting from combination of the direct current voltages from said bridge circuits, said alternating current being fed to said collecting and distributing means to compensate the harmonic frequencies generated, and optionally the reactive power consumed, by said traction equipment and said auxiliary equipment of said locomotive and retransmitted to said overhead contact wire.

The collector and distributor means generally comprise an input transformer. In this case the active filter may be connected on the alternating current side:

to a dedicated secondary winding of the input transformer, or to a secondary winding of a specific transformer whose primary shunts the primary of the input transformer, or in series with an inductor, this series-connected combination shunting the primary winding of the input transformer, or to part or the whole of a secondary winding feeding the traction equipment or the auxiliary equipment, or to a part of the primary winding.

The bridge circuits advantageously comprise branches in the form of bidirectional solid state switches with forced on and off switching.

These switches may each comprise a diode connected in reverse parallel with an IGBT transistor, an MCT thyristor or a GTO thyristor.

If the active filter comprises two bridge circuits, one may be fed with a direct current voltage whose value is three times the direct current voltage fed to the other bridge circuit. One of these direct current voltages may be supplied by a direct current voltage generator and the other by a capacitor.

If the active filter comprises three bridge circuits, each may be fed at the same direct current voltage.

The invention will be better understood and other advantages and features of the invention will emerge from the following description given by way of non-limiting example and with reference to the appended drawings.

DETAILED DESCRIPTION OF THE INVENTION

Figure 1:
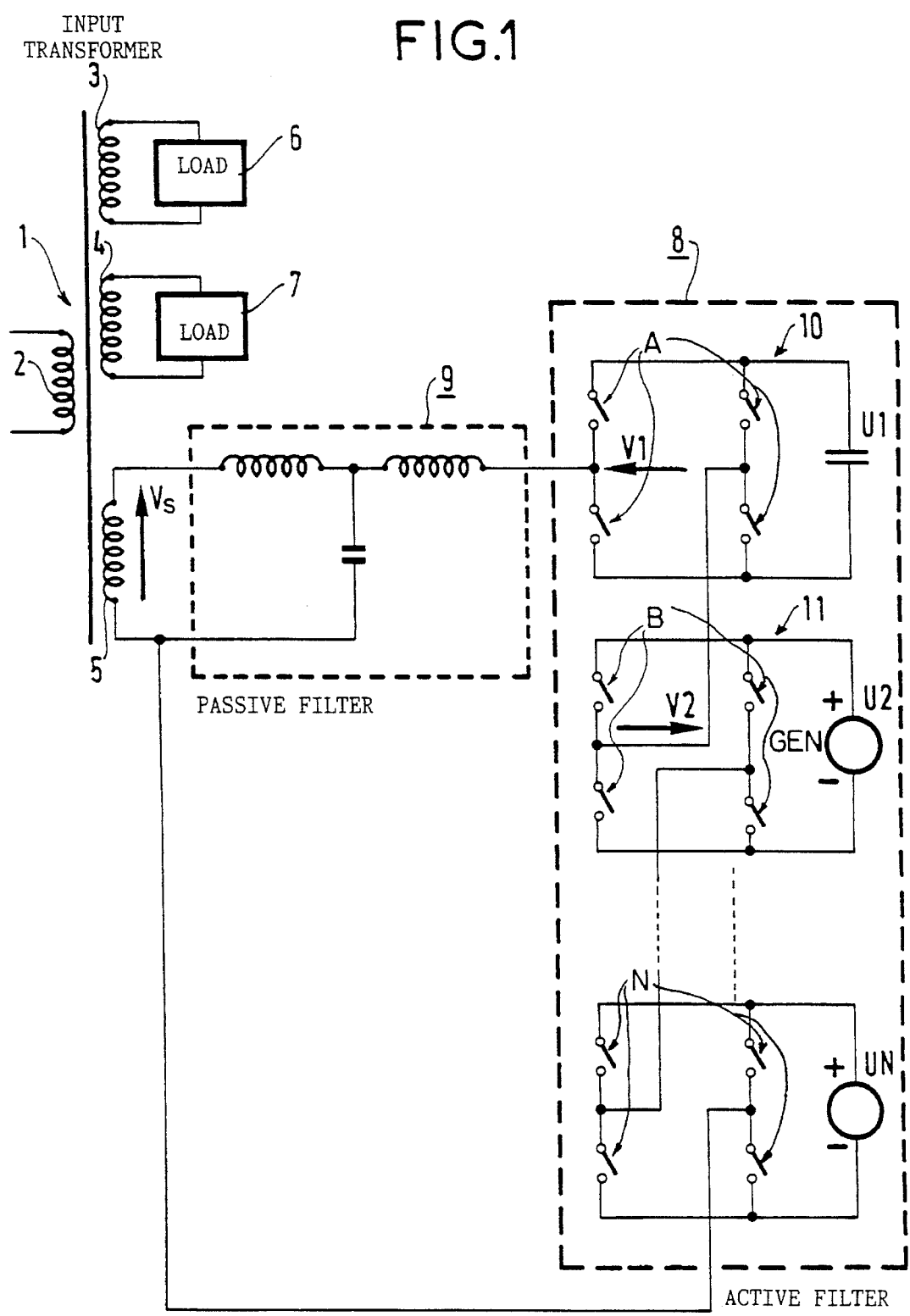
FIG. 1 shows the input transformer of an electric locomotive equipped with an active filter in accordance with the invention.

FIG. 1 shows an input transformer 1 of an electric locomotive equipped with an active filter 8 in accordance with the invention. The transformer 1 has a primary winding 2 and multiple secondary windings 3, 4 and 5. The secondary windings 3 and 4 feed loads 6 and 7 which may be traction equipment or auxiliary equipment. Passive filters may be connected to the secondary windings 3 and 4. Each may comprise an inductor and a capacitor in series, for example.

The secondary winding 5 feeds a number N of forced switching bridge circuits 10, 11, etc connected in series on the alternating current side and fed by independent direct current voltages $U_1, U_2, \ldots, U_N$.

A passive filter 9 may be added to the system. It may be disposed between the secondary winding 5 and the active filter 8. It may comprise two inductors connected in series between one terminal of the secondary winding 5 and the active filter and a capacitor connecting the point common to the two inductors to the other terminal of the secondary winding 5.

Figure 2:
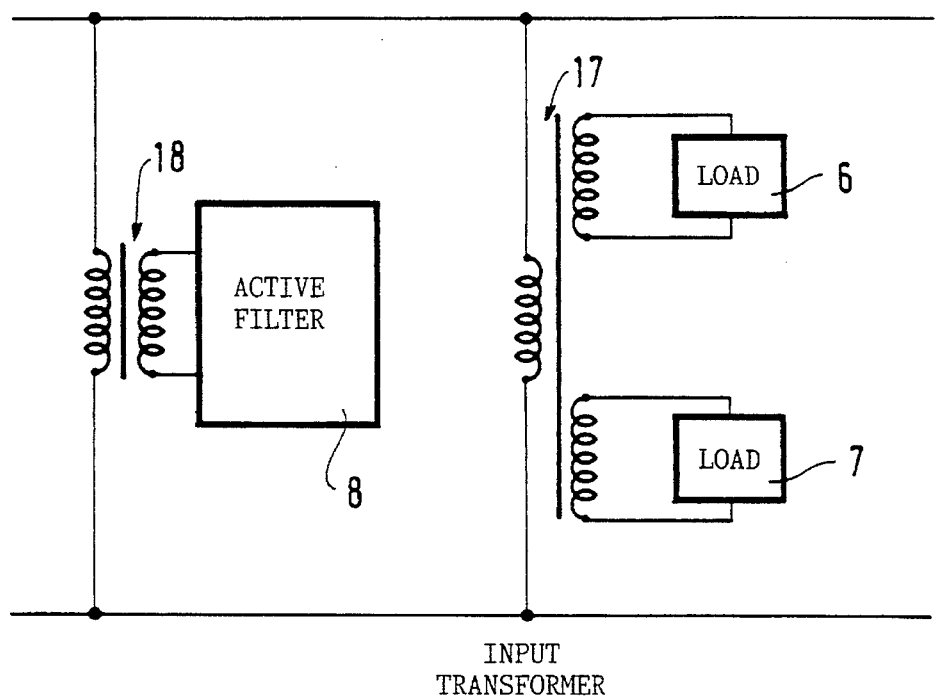
FIGS. 2 through 5 show various connections of an active filter in accordance with the invention to an input transformer of an electric locomotive.

Referring to FIG. 2, the input transformer 17 feeds the loads 6 and 7. The active filter 8 is connected to the secondary winding of a transformer 18 whose primary winding shunts the primary winding of the input transformer 17.

Figure 3:
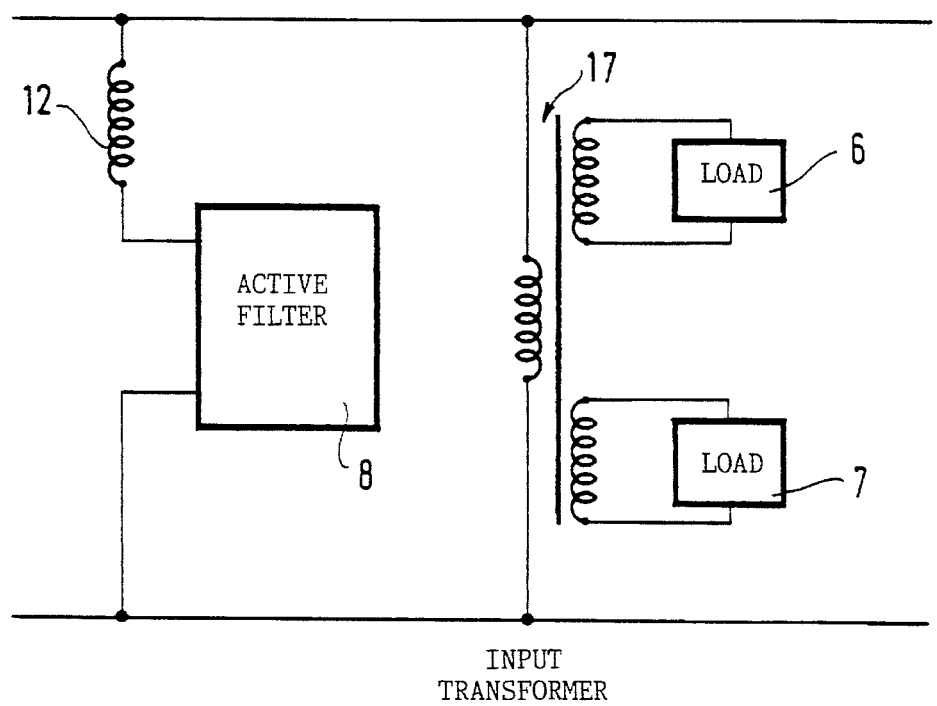

Referring to FIG. 3, the same input transformer 17 feeds the loads 6 and 7. Here the active filter 8 is connected in series with an inductor 12. The series-connected combination of the active filter and the inductor 12 shunts the primary winding of the input transformer.

Figure 4:
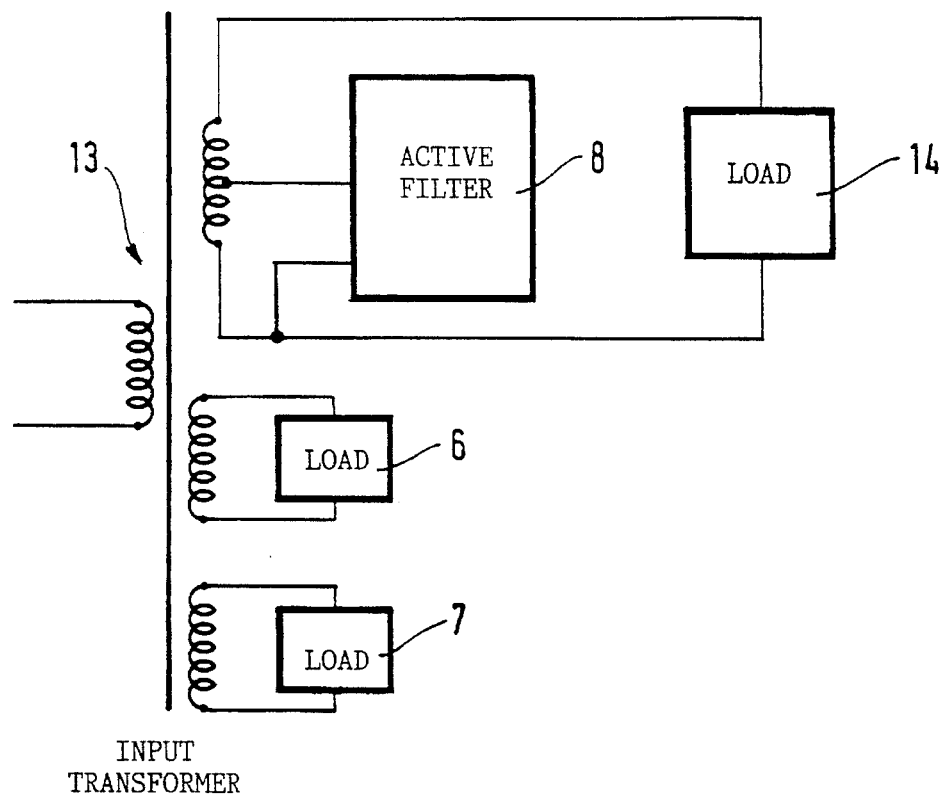

Referring to FIG. 4, the input transformer 13 has secondary windings which feed loads 6, 7 and 14. The active filter 8 shunts part of the secondary winding feeding the load 14. It could if necessary shunt all of the secondary winding, in other words it could shunt the load 14.

Figure 5:
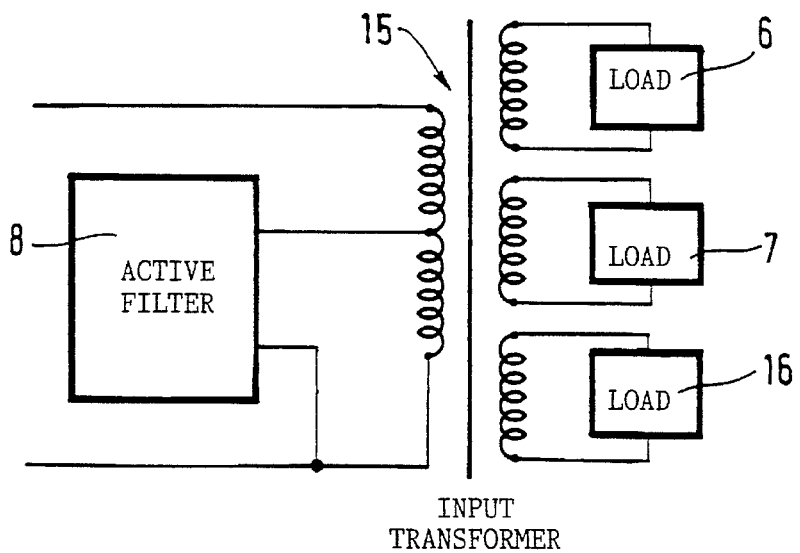

Referring to FIG. 5, the input transformer 15 feeds the loads 6, 7 and 16. The active filter 8 shunts part of the primary winding of the input transformer 15.

There will now be described by way of example the situation in which the active filter 8 comprises two bridge circuits 10 and 11 (see FIG. 1).

The bridge circuit 11 is fed by a direct current voltage $U_2$ which may be the voltage supplying the auxiliary circuits and delivers a voltage U. The bridge circuit 10 is fed by a direct current voltage supply which may be a capacitor the voltage $U_1$ across which is equal to 3U.

As the DC voltage across the bridge circuit 11 is relatively low (500 V, for example) the bridge circuit may use IGBT transistors. Each branch of the bridge circuit 11 thus comprises a diode connected in reverse parallel with a transistor. The bridge circuit 11 can then operate at a very high frequency. It supplies the voltage $V_2$ which has three states: U, O and –U.

As the voltage across the bridge circuit 10 is relatively high (1 500 V if U=500 V) GTO thyristors are used. They have a switching thermal constraint. Each branch of the bridge circuit 10 thus comprises a diode connected in reverse parallel with a GTO thyristor. The bridge circuit 10 operates at a low frequency. It supplies a voltage $V_1$ which has three states: $U_1$, O and $-U_1$; $U_1$=3U.

The voltage $V_S$ applied to the winding 5 is the result of combining the voltages from the two bridge circuits: $V_S$=$V_1$+$V_2$. Consequently, the voltage $V_S$ can assume any of nine states: $U_1$+ U, $U_1$, $U_1$–U, U, O, –U, –$U_1$+U, –$U_1$ and –$U_1$–U (with $U_1$=3U).

Figure 6:
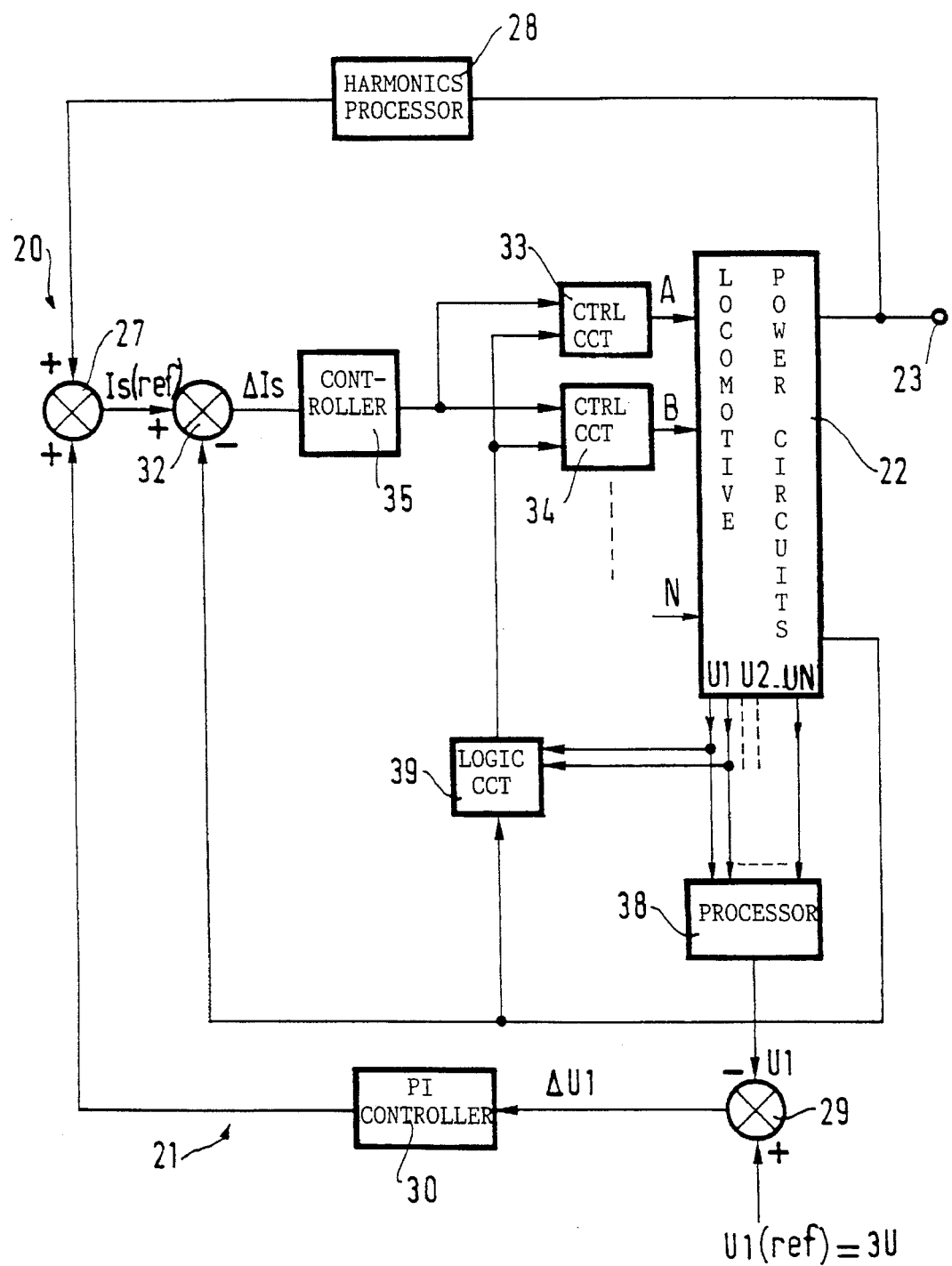
FIG. 6 is a block schematic of a control system of an active filter in accordance with the invention.

FIG. 6 shows the operation of a control system for an active filter in accordance with the invention. The active filter is controlled by two loop circuits: a harmonic processor loop 20 and a loop 21 controlling the voltage $U_1$ of the capacitor feeding the bridge circuit 10.

The loop 20 is the active filter loop and is concerned with processing harmonics and optionally with improving the power factor. The processing is optimized according to relevant priorities. The highest priority may be to process the psophometric current (or equivalent disturbing current), for example.

The block 22 represents the electrical power circuits of the locomotive: input transformer, rectifier bridges. The terminal 23 carries the measured interference currents, i.e. the harmonics. These are processed by the processor 28 which applies a fast Fourier transform to the input data, processes the harmonics in accordance with identified priorities (choice of frequencies, weighting) and applies a reverse Fourier transform.

The signal spectrum is processed digitally to establish a reference for the harmonics of the current to be compensated. This reference is fed to the circuit 27.

The loop 21 controls the fundamental frequency of the current in the secondary winding of the active filter to keep the voltage $U_1$ constant and equal to its reference value $U_1$(ref)=3U.

The loop 21 measures the voltage $U_1$ across the capacitor and the comparator 29 compares the measured value to the reference value.

The difference $\Delta U_1$ between these values is fed to the input of the proportional-integral controller 30. This produces a current at a fundamental frequency in the secondary winding of the active filter. After rectification by the active filter bridge circuits this produces a direct current which controls the voltage across the capacitor.

The circuit 27 establishes the active filter current fundamental frequency and harmonics reference $I_S$(ref). The comparator 32 compares the currents $I_S$(ref) and $I_S$ (current measured in secondary winding 5) to produce a current difference $\Delta I_S$ which is to be nulled.

$\Delta I_S$ is nulled by the control circuits 33 and 34 of the respective bridge circuits 10 and 11. The circuits 33 and 34 are logic circuits and their number is the same as the number of bridge circuits. The controller 35 receives the current difference $\Delta I_S$ and outputs instructions to all the forced switching mode bridge circuits.

The circuit 38 processes the measured voltages $U_1$ and $U_2$ (up to $U_N$ if there are N bridge circuits). The circuit 39 is a logic circuit which distinguishes between the states of each voltage source $U_1$ and $U_2$ (up to $U_N$ where applicable).

The invention uses a small number of components which is favorable to its reliability, overall size and mass which are fundamental criteria for any equipment used on board a vehicle.

There is claimed:

1. An active filter for filtering the current and improving the power factor of a single-phase voltage overhead contact wire-energized locomotive having an input transformer for collecting the voltage supplied by said overhead contact wire and for distributing voltages to traction equipment and auxiliary equipment of said locomotive, said active filter comprising:

two or more forced switching mode bridge inverter circuits (10, 11) which are connected to a dedicated secondary winding of said input transformer, which are in series on the alternating current sides thereof and which are fed with respective independent direct current voltages; and a control system which forces switching of said bridge circuits to produce an alternating current on the single-phase side from different voltage levels resulting from combination of the direct current voltages from said bridge circuits, said produced alternating current being fed to said input transformer to compensate harmonic frequencies generated, and the reactive power consumed, by said traction equipment and said auxiliary equipment of said locomotive and retransmitted to said overhead contact wire;

wherein the direct current voltages feeding said bridge circuits are provided by a direct current generator for one of said bridge circuits and by a capacitor for the other of said bridge circuits; and wherein said control system comprises: a processor (28) enabling selection of the harmonic frequencies to be compensated a harmonic frequency processor closed loop (20); and a capacitor-voltage control closed loop (21).

* * * * *